(12) United States Patent
Ghattu et al.

(10) Patent No.: US 12,236,289 B2
(45) Date of Patent: Feb. 25, 2025

(54) METHOD AND SYSTEM FOR CONFIGURATION-BASED APPLICATION PROGRAMMING INTERFACE TESTING FRAMEWORK

(71) Applicant: JPMorgan Chase Bank, N.A., New York, NY (US)

(72) Inventors: Satya Ghattu, Hillsborough, NJ (US); Prasad Gundeti, Telangana (IN); Yousuf Nizam, Hyderabad (IN)

(73) Assignee: JPMORGAN CHASE BANK, N.A., New York, NY (US)

( * ) Notice: Subject to any disclaimer, the term of this patent is extended or adjusted under 35 U.S.C. 154(b) by 257 days.

(21) Appl. No.: 17/942,539

(22) Filed: Sep. 12, 2022

(65) Prior Publication Data

US 2024/0036947 A1 Feb. 1, 2024

(30) Foreign Application Priority Data

Jul. 28, 2022 (IN) .............................. 202211043214

(51) Int. Cl.
*G06F 9/54* (2006.01)
*G06F 11/36* (2006.01)

(52) U.S. Cl.
CPC .............. *G06F 9/542* (2013.01); *G06F 9/541* (2013.01); *G06F 9/547* (2013.01); *G06F 11/3664* (2013.01); *G06F 11/3684* (2013.01); *G06F 11/3688* (2013.01)

(58) Field of Classification Search
CPC . G06F 9/54; G06F 9/541; G06F 9/542; G06F 9/547; G06F 11/36; G06F 11/3664; G06F 11/3672; G06F 11/3676; G06F 11/3684; G06F 11/3688; G06F 11/3692
See application file for complete search history.

(56) References Cited

U.S. PATENT DOCUMENTS

| | | | | |
|---|---|---|---|---|
| 10,409,711 | B2 * | 9/2019 | Dolby | G06F 11/3688 |
| 10,437,712 | B1 * | 10/2019 | Tyler | G06F 11/3684 |
| 10,496,532 | B1 * | 12/2019 | Kaitha | G06F 11/3419 |
| 10,678,679 | B1 * | 6/2020 | Sonawale | G06F 11/3684 |
| 10,684,940 | B1 * | 6/2020 | Kayal | G06F 11/3664 |
| 11,347,631 | B1 | 5/2022 | Merritt | |

(Continued)

OTHER PUBLICATIONS

International Search Report and Written Opinion in corresponding International Application No. PCT/US2022/043199, dated Jan. 3, 2023.

*Primary Examiner* — Kevin L Young
*Assistant Examiner* — Jennifer Marie Gutman
(74) *Attorney, Agent, or Firm* — Greenblum & Bernstein, P.L.C.

(57) ABSTRACT

A method and system for using a configuration-based framework for testing an application programming interface (API) are provided. The method includes receiving identification information about one or more APIs to be tested; defining, based on the first information, at least two API endpoints and one or more dependencies to be tested; retrieving an authentication model to be used for accessing the APIs; generating a testing plan based on the API endpoints, the dependencies, and the authentication model; executing a test of the APIs based on the testing plan; and displaying at least one result of the executed test on a graphical user interface (GUI).

20 Claims, 6 Drawing Sheets

(56) References Cited

U.S. PATENT DOCUMENTS

| | | |
|---|---|---|
| 11,442,725 B1 * | 9/2022 | Chawda .................... G06F 8/76 |
| 2017/0060715 A1 * | 3/2017 | Ye .......................... G06F 11/263 |
| 2017/0222883 A1 | 8/2017 | Ojha et al. |
| 2020/0110667 A1 * | 4/2020 | Al-Alem ............. G06F 11/1438 |
| 2020/0233786 A1 | 7/2020 | Battaglia et al. |
| 2020/0334134 A1 * | 10/2020 | Kalyanaraman .... G06F 11/3688 |
| 2020/0409826 A1 | 12/2020 | Balasubramanian et al. |
| 2020/0409831 A1 * | 12/2020 | Balasubramanian ........................ G06F 11/3476 |
| 2021/0042207 A1 | 2/2021 | Joyce et al. |
| 2023/0004427 A1 * | 1/2023 | Panikkar .................... G06F 9/54 |
| 2023/0027880 A1 * | 1/2023 | Brown ................ G06F 11/3684 |
| 2023/0106929 A1 * | 4/2023 | Saha .................. G06F 11/3688 717/124 |
| 2023/0214312 A1 * | 7/2023 | Toal .................... G06F 11/3664 717/125 |

* cited by examiner

METHOD AND SYSTEM FOR CONFIGURATION-BASED APPLICATION PROGRAMMING INTERFACE TESTING FRAMEWORK

CROSS-REFERENCE TO RELATED APPLICATIONS

This application claims priority benefit from Indian Application No. 202211043214, filed Jul. 28, 2022, which is hereby incorporated by reference in its entirety.

BACKGROUND

1. Field of the Disclosure

This technology generally relates to methods and systems for testing an application programming interface (API), and more particularly to methods and systems for providing a testing framework for APIs using a configuration-based approach in order to facilitate testing efficiency and reliability.

2. Background Information

Recently, many business applications are being subjected to a modernization journey by which each application is reconfigured as a combination of microservice applications supported by application programming interfaces (APIs). The testing of such APIs is often challenging and complicated. The challenges may be increased when software developers are also required to perform integration testing with other applications that may be supported by APIs. In addition, there may be a need to combine several individual APIs into a chain in order to test an entire feature set, and in this situation, a test may require an execution of multiple API endpoints by collecting an output of one API and feeding that output as an input to the next API.

In some cases, API testing may be required to operate on a relatively large scale, such as, for example, hundreds of tests being performed in parallel. When such tests are performed, there is a need for a report that indicates a success/failure rate for each test, and this reporting needs to be available in a clear and visually comprehensible manner so that users can efficiently assess the progress of the testing.

Accordingly, there is a need for a methodology for providing a testing framework for APIs using a configuration-based approach in order to facilitate testing efficiency and reliability.

SUMMARY

The present disclosure, through one or more of its various aspects, embodiments, and/or specific features or sub-components, provides, inter alia, various systems, servers, devices, methods, media, programs, and platforms for providing a testing framework for APIs using a configuration-based approach in order to facilitate testing efficiency and reliability.

According to an aspect of the present disclosure, a method for testing an application programming interface (API) is provided. The method is implemented by at least one processor. The method includes: receiving, by the at least one processor, first information that includes an identification of at least one API to be tested; defining, by the at least one processor based on the first information, at least two API endpoints to be tested; defining, by the at least one processor, at least one dependency that relates to at least one from among the at least two API endpoints; retrieving, by the at least one processor, an authentication model to be used for accessing the at least one API; generating, by the at least one processor, a testing plan based on the at least two API endpoints, the at least one dependency, and the authentication model; and executing, by the at least one processor, a test of the at least one API by using the generated testing plan.

The method may further include displaying at least one result of the executed test on a graphical user interface (GUI).

The at least one result may include at least one from among second information that identifies at least one microservice failure; third information that indicates a reason for the at least one microservice failure; fourth information that relates to a completion time for the executed test; and fifth information that relates to at least one measurable metric that indicates a status of the at least one API.

The method may further include transmitting a status notification message to at least one predetermined destination. The status notification message may include information that relates to the at least one result of the executed test.

The method may further include determining, by the at least one processor, a number of times that the test is to be executed with respect to the at least one API.

The method may further include determining whether at least a first subset of occurrences of the test are to be executed in parallel and determining whether at least a second subset of occurrences of the test are to be executed sequentially.

The method may further include executing an artificial intelligence (AI) algorithm that implements a machine learning technique in order to generate a prediction of a result of a future test execution with respect to the at least one API. The AI algorithm may be trained by using data that relates to results of previous test executions with respect to the at least one API.

The method may further include receiving a user input that relates to adjusting the testing plan and re-executing the test of the at least one API based on the adjusted testing plan.

The method may further include re-executing the test of the at least one API after the at least one API has received an asynchronous call to perform a function.

When a microservice failure with respect to a first microservice occurs as a result of a current execution of the test, the method may further include generating a new testing plan based on data that has previously been outputted by the first microservice and data that has been outputted during the current execution of the test.

According to another aspect of the present disclosure, a computing apparatus for testing an API is provided. The computing apparatus includes a processor; a memory; a display; and a communication interface coupled to each of the processor, the memory, and the display. The processor is configured to: receive, via the communication interface, first information that includes an identification of at least one API to be tested; define, based on the first information, at least two API endpoints to be tested; define at least one dependency that relates to at least one from among the at least two API endpoints; retrieve an authentication model to be used for accessing the at least one API; generate a testing plan based on the at least two API endpoints, the at least one dependency, and the authentication model; and execute a test of the at least one API by using the generated testing plan.

The processor may be further configured to cause the display to display at least one result of the executed test via a graphical user interface (GUI).

The at least one result may include at least one from among second information that identifies at least one microservice failure; third information that indicates a reason for the at least one microservice failure; fourth information that relates to a completion time for the executed test; and fifth information that relates to at least one measurable metric that indicates a status of the at least one API.

The processor may be further configured to transmit, via the communication interface, a status notification message to at least one predetermined destination. The status notification message may include information that relates to the at least one result of the executed test.

The processor may be further configured to determine a number of times that the test is to be executed with respect to the at least one API.

The processor may be further configured to determine whether at least a first subset of occurrences of the test are to be executed in parallel and to determine whether at least a second subset of occurrences of the test are to be executed sequentially.

The processor may be further configured to execute an artificial intelligence (AI) algorithm that implements a machine learning technique in order to generate a prediction of a result of a future test execution with respect to the at least one API. The AI algorithm may be trained by using data that relates to results of previous test executions with respect to the at least one API.

The processor may be further configured to receive a user input that relates to adjusting the testing plan and to re-execute the test of the at least one API based on the adjusted testing plan.

The processor may be further configured to re-execute the test of the at least one API after the at least one API has received an asynchronous call to perform a function.

When a microservice failure with respect to a first microservice occurs as a result of a current execution of the test, the processor may be further configured to generate a new testing plan based on data that has previously been outputted by the first microservice and data that has been outputted during the current execution of the test.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
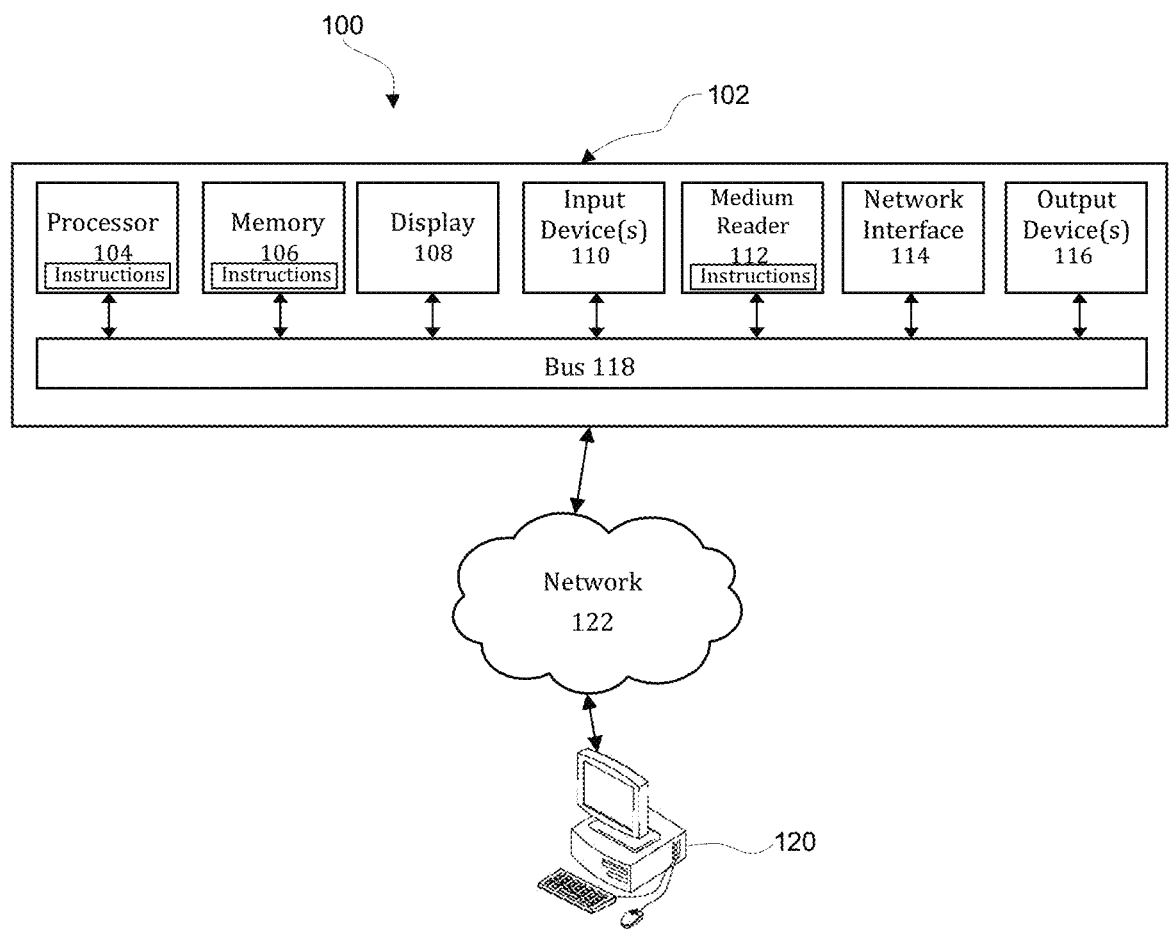
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data as well as executable instructions and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid state display, a cathode ray tube (CRT), a plasma display, or any other type of display, examples of which are well known to skilled persons.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As illustrated in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is illustrated in FIG. 1 as a wireless network, those skilled in the art appreciate that the network 122 may also be a wired network.

The additional computer device 120 is illustrated in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for providing a testing framework for APIs using a configuration-based approach in order to facilitate testing efficiency and reliability.

Figure 2:
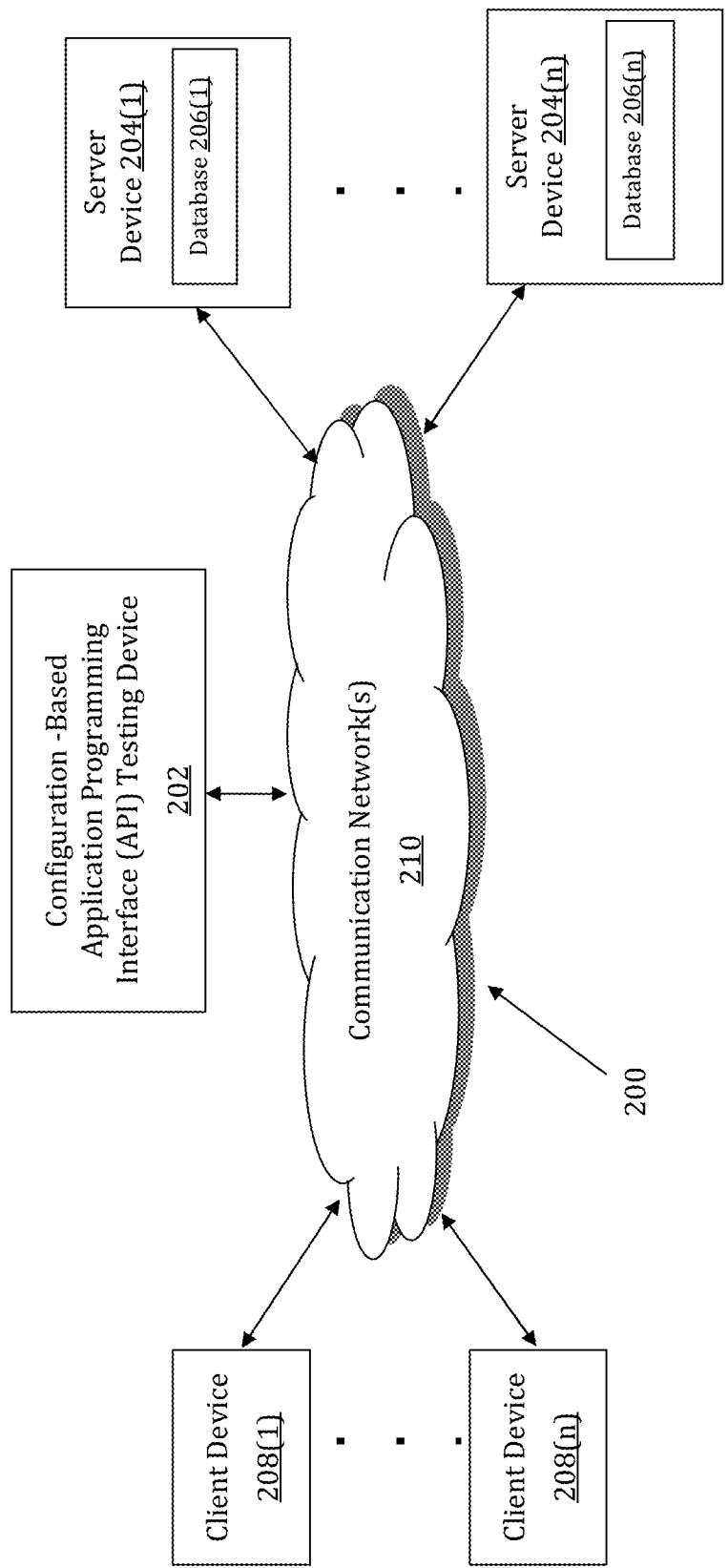
FIG. 2 illustrates an exemplary diagram of a network environment.

Referring to FIG. 2, a schematic of an exemplary network environment 200 for implementing a method for providing a testing framework for APIs using a configuration-based approach in order to facilitate testing efficiency and reliability is illustrated. In an exemplary embodiment, the method is executable on any networked computer platform, such as, for example, a personal computer (PC).

The method for providing a testing framework for APIs using a configuration-based approach in order to facilitate testing efficiency and reliability may be implemented by a Configuration-Based Application Programming Interface Testing (CBAPIT) device 202. The CBAPIT device 202 may be the same or similar to the computer system 102 as described with respect to FIG. 1. The CBAPIT device 202 may store one or more applications that can include executable instructions that, when executed by the CBAPIT device 202, cause the CBAPIT device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the CBAPIT device 202 itself, may be located in virtual server(s) running in a cloud-based computing environment rather than being tied to one or more specific physical network computing devices. Also, the application(s) may be running in one or more virtual machines (VMs) executing on the CBAPIT device 202. Additionally, in one or more embodiments of this technology, virtual machine(s) running on the CBAPIT device 202 may be managed or supervised by a hypervisor.

In the network environment 200 of FIG. 2, the CBAPIT device 202 is coupled to a plurality of server devices 204(1)-204(n) that hosts a plurality of databases 206(1)-206(n), and also to a plurality of client devices 208(1)-208(n) via communication network(s) 210. A communication interface of the CBAPIT device 202, such as the network interface 114 of the computer system 102 of FIG. 1, operatively couples and communicates between the CBAPIT device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the CBAPIT device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and CBAPIT devices that efficiently implement a method for providing a testing framework for APIs using a configuration-based approach in order to facilitate testing efficiency and reliability.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The CBAPIT device 202 may be a standalone device or integrated with one or more other devices or apparatuses, such as one or more of the server devices 204(1)-204(n), for example. In one particular example, the CBAPIT device 202 may include or be hosted by one of the server devices 204(1)-204(n), and other arrangements are also possible. Moreover, one or more of the devices of the CBAPIT device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the CBAPIT device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store configuration data that relates to API testing arrangements and data that relates to metrics generated as results of API testing.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the CBAPIT device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the CBAPIT device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the CBAPIT device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the CBAPIT device 202, the server devices 204(1)-204(n), or the client devices 208(1)-208(n), for example, may be configured to operate as virtual instances on the same physical machine. In other words, one or more of the CBAPIT device 202, the server devices 204(1)-204(n), or the client devices 208(1)-208(n) may operate on the same physical device rather than as separate devices communicating through communication network(s) 210. Additionally, there may be more or fewer CBAPIT devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
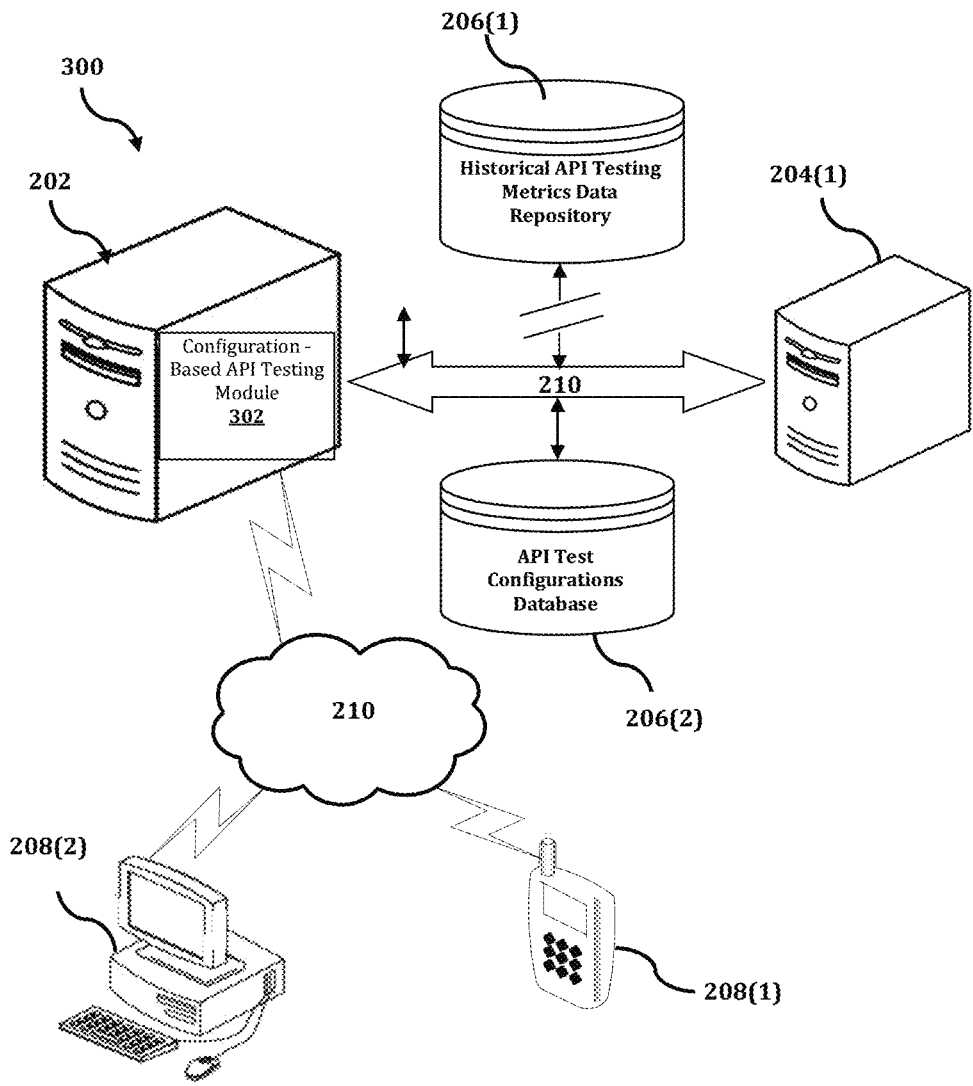
FIG. 3 shows an exemplary system for implementing a method for providing a testing framework for APIs using a configuration-based approach in order to facilitate testing efficiency and reliability.

The CBAPIT device 202 is described and illustrated in FIG. 3 as including a configuration-based API testing module 302, although it may include other rules, policies, modules, databases, or applications, for example. As will be described below, the configuration-based API testing module 302 is configured to implement a method for providing a testing framework for APIs using a configuration-based approach in order to facilitate testing efficiency and reliability.

An exemplary process 300 for implementing a mechanism for providing a testing framework for APIs using a configuration-based approach in order to facilitate testing efficiency and reliability by utilizing the network environment of FIG. 2 is illustrated as being executed in FIG. 3. Specifically, a first client device 208(1) and a second client device 208(2) are illustrated as being in communication with CBAPIT device 202. In this regard, the first client device 208(1) and the second client device 208(2) may be "clients" of the CBAPIT device 202 and are described herein as such. Nevertheless, it is to be known and understood that the first client device 208(1) and/or the second client device 208(2) need not necessarily be "clients" of the CBAPIT device 202, or any entity described in association therewith herein. Any additional or alternative relationship may exist between either or both of the first client device 208(1) and the second client device 208(2) and the CBAPIT device 202, or no relationship may exist.

Further, CBAPIT device 202 is illustrated as being able to access a historical API testing metrics data repository 206(1) and an API test configurations database 206(2). The configuration-based API testing module 302 may be configured to access these databases for implementing a method for providing a testing framework for APIs using a configuration-based approach in order to facilitate testing efficiency and reliability.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the CBAPIT device 202 via broadband or cellular communication. Of course, these embodiments are merely exemplary and are not limiting or exhaustive.

Upon being started, the configuration-based API testing module 302 executes a process for providing a testing framework for APIs using a configuration-based approach in order to facilitate testing efficiency and reliability. An exemplary process for providing a testing framework for APIs using a configuration-based approach in order to facilitate testing efficiency and reliability is generally indicated at flowchart 400 in FIG. 4.

Figure 4:
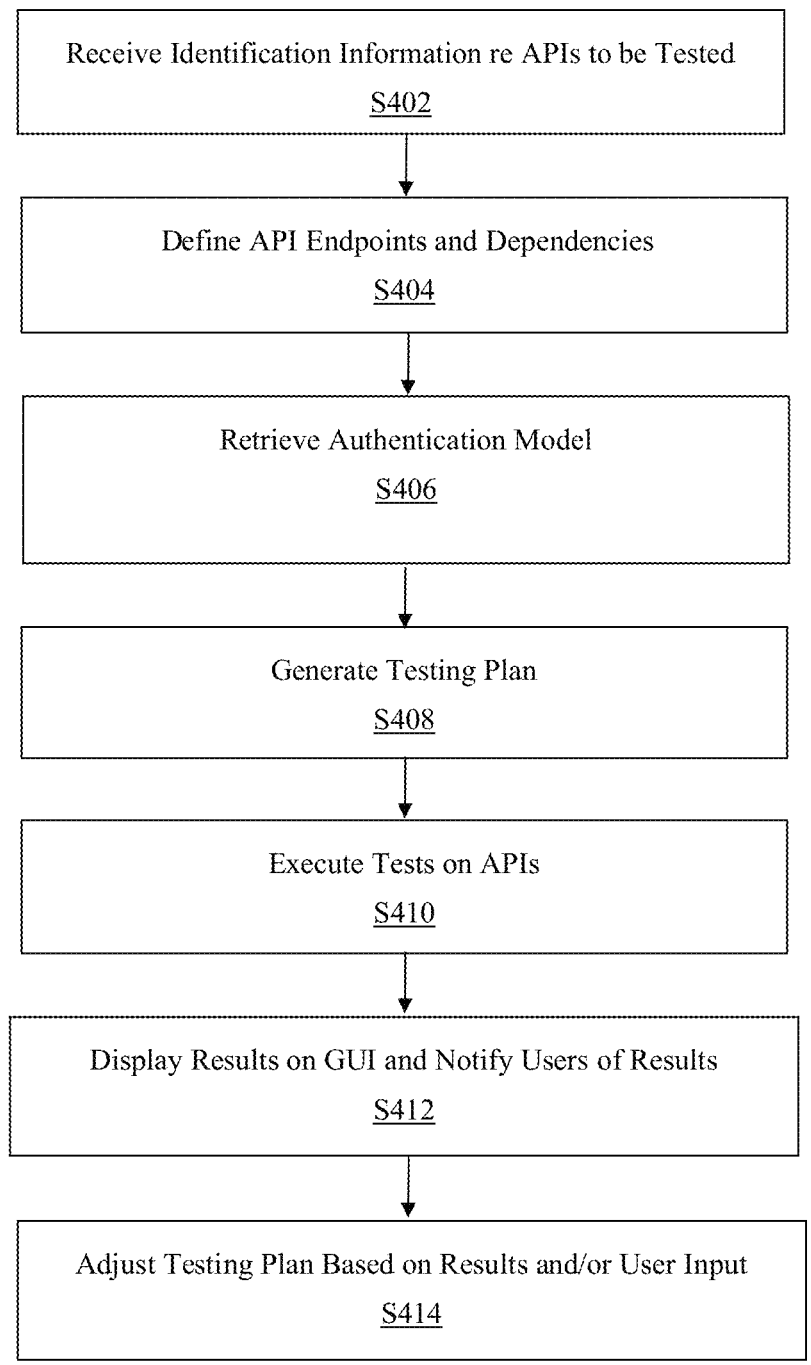
FIG. 4 is a flowchart of an exemplary process for implementing a method for providing a testing framework for APIs using a configuration-based approach in order to facilitate testing efficiency and reliability.

In process 400 of FIG. 4, at step S402, the configuration-based API testing module 302 receives information that includes an identification of at least one API to be tested. The information may include, for example, a configuration file that provides documentation that identifies one or more APIs. In an exemplary embodiment, the number of APIs to be tested may vary, and each API may be associated with one or more microservice operations.

At step S404, the configuration-based API testing module 302 defines at least two API endpoints to be tested and at least one dependency that relates to at least one of the API endpoints based on the information received in step S402. Then, at step S406, the configuration-based API testing module 302 retrieves an authentication model to be used for accessing the APIs to be tested. In an exemplary embodiment, the information received in step S402 includes an indication regarding which authentication model is suitable for the testing.

At step S408, the configuration-based API testing module 302 automatically generates a testing plan based on the defined API endpoints and dependencies and the authentication mode. Then, at step S410, the configuration-based API testing module 302 executes a test by using the testing plan. In an exemplary embodiment, the testing plan indicates a number of times that the test is to be executed. In addition, the testing plan may also indicate whether the tests are to be executed sequentially or whether the tests may be executed in parallel. In this aspect, the generation of the test plan may include determining a first subset of occurrences of the tests to be executed in parallel and a second subset of occurrences of the test to be executed in sequence.

At step S412, the configuration-based API testing module 302 displays results of the executed test via a graphical user interface (GUI) and transmits a message to a predetermined destination providing a notification that indicates the results of the test. In an exemplary embodiment, the results may include any one or more of the following: information that identifies at least one microservice failure; information that indicates a reason for the microservice failure(s); information that relates to a completion time for the executed test; and/or information that relates to at least one measurable metric that indicates a status of the API(s) being tested. The notification message may be sent to a user and/or a stakeholder that has an interest in the status of the API(s) being tested.

At step S414, the configuration-based API testing module 302 adjusts the testing plan. In an exemplary embodiment, adjustments to the testing plan may be based on test results, inputs provided by a user, and/or intervening events, such as, for example, an asynchronous call to an API being tested to perform a function. For example, when a microservice failure occurs as a result of an execution of the test, a new testing plan that is based on data that has been outputted during the execution of the test and data that has previously been outputted by the microservice prior to the failure thereof. When an adjusted testing plan is generate, the configuration-based API testing module 302 may repeat steps S410 and S412 by re-executing the test based on the adjusted testing plan, and further adjustments may also be made by repeating step S414.

In an exemplary embodiment, a method for providing a testing framework for APIs using a configuration-based approach in order to facilitate testing efficiency and reliability may be understood in accordance with the following definitions: 1) Workflow: A workflow includes an API, an API method type, an authentication type, a mapping to a payload configuration, and a parser method that is able to parse the output of the API according to a user requirement. 2) Payload: A list of key/value pairs to invoke a workflow. Values may be either hardcoded or randomly generated. 3) Dependency: A sequential relation between workflows based on a condition placed on data associated with at least one of the workflows. 4) Execution: A run-time instance of a workflow and/or a chain of workflows with associated outputs and status.

In an exemplary embodiment, a configuration file includes several sections. For example, a first section of a configuration file may include a list of workflows in context; a second section may include a payload configuration associated with each workflow; a third section may include a dependency definition; and a fourth section may include a scheduling configuration.

In an exemplary embodiment, a payload generation module (PGM) has access to a payload configuration, which is of the format "Key": "Value". The possible types of values may include any one or more of the following: 1) Hardcoded values: any value; 2) Generated values: <randoms>, <randomi>; i.e., inbuilt syntax to generate a random string and integer respectively; 3) Hybrid values: for example, hello-<randoms>; and 4) Dependency based values: for example, $<key1>.<key2>; i.e., a dependency value refers to obtaining a value from the output of the previous workflow, in order to facilitate configuring the values based on values of previous workflows in the dependency chain. In an exemplary embodiment, the PGM uses the payload configuration to generate a payload required to invoke the API.

Request Processing Module (RPM): In an exemplary embodiment, the RPM is the core engine and is tasked with invoking the API specified within the workflow. After obtaining a response, the RPM invokes a parser method on this data. Parsers: In an exemplary embodiment, a default parser searches for a "status" key in the response data, and based on the value of this key, the parser determines whether the test execution was a success or a failure. However, a user may have an ability to define a custom parser, which may use customized logic for determining when to mark a particular test execution as a success or a failure.

In an exemplary embodiment, there are two types of workflows: 1) Asynchronous: In an asynchronous workflow, there is an action endpoint and status endpoint defined in the workflow definition, and these endpoints are used to perform an action and then poll status based on the action. For the asynchronous workflow, a user may implement an action parser and a status parser, or may use default parsers. 2) Synchronous: In a synchronous workflow, there is only an action endpoint in the workflow definition, which is then used to perform the action. For the synchronous workflow, the user implements only one parser, i.e., either the action parser or the default parser.

Scheduler: In an exemplary embodiment, a scheduler component resides in the RPM module and is responsible for timely executions of the workflows as specified in the scheduling configuration. In addition, the scheduler saves the execution.

Figure 5:
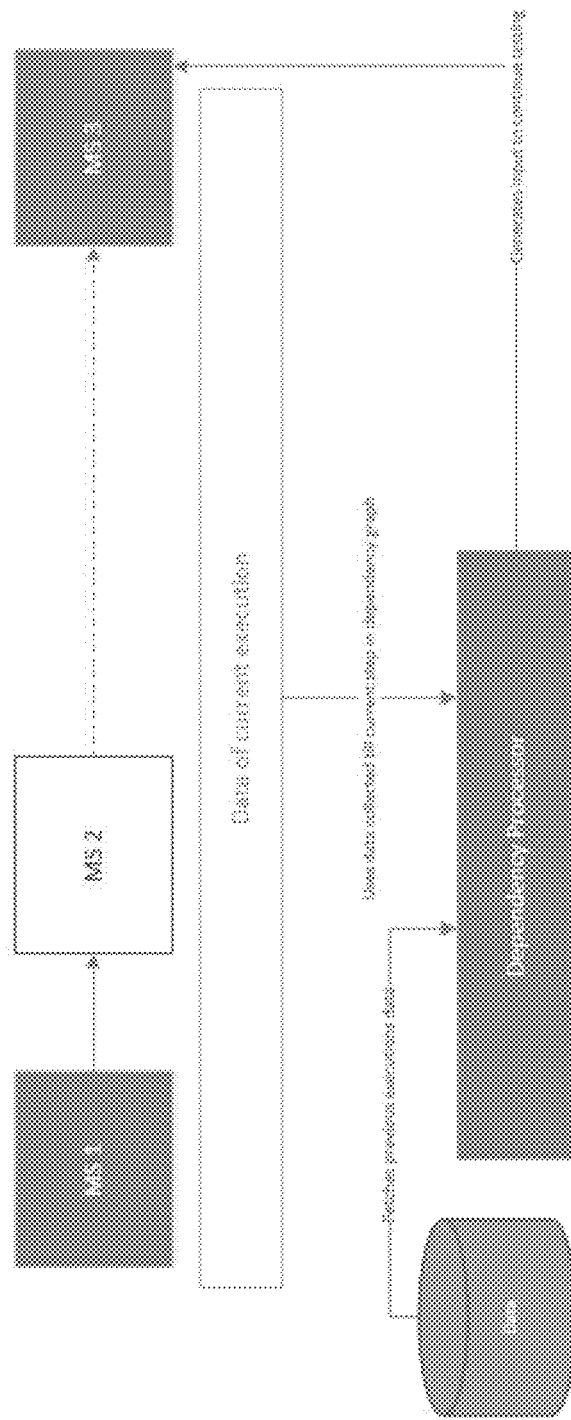
FIG. 5 is a flow diagram that illustrates a test resumption process with respect to a microservice failure that occurs during an execution of a test of an API in connection with a method for providing a testing framework for APIs using a configuration-based approach in order to facilitate testing efficiency and reliability, according to an exemplary embodiment.

Auto Healing: FIG. 5 is a flow diagram 500 that illustrates a test resumption process with respect to a microservice failure that occurs during an execution of a test of an API in connection with a method for providing a testing framework for APIs using a configuration-based approach in order to facilitate testing efficiency and reliability, according to an exemplary embodiment. As illustrated in flow diagram 500, when a failure of a particular microservice involved in the dependency occurs, the dependency processor examines previously outputted data that has been gathered from the microservice and then combine this data with the data generated in the current execution in order to generate a synthetic payload for the subsequent microservices. In this manner, the effect of a microservice failure on other microservices may be tested.

Figure 6:
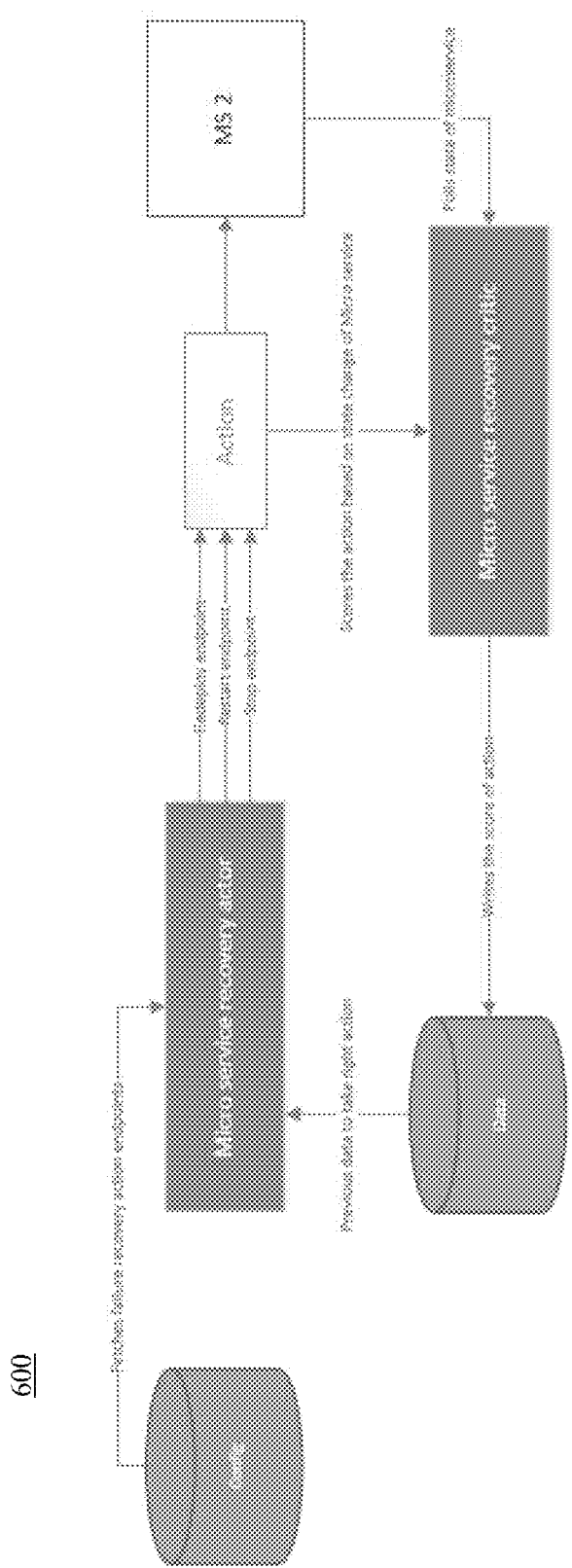
FIG. 6 is a flow diagram that illustrates a microservice recovery process with respect to a microservice failure that occurs during an execution of a test of an API in connection with a method for providing a testing framework for APIs using a configuration-based approach in order to facilitate testing efficiency and reliability, according to an exemplary embodiment.

Recovery of Failed Microservice: FIG. 6 is a flow diagram 600 that illustrates a microservice recovery process with respect to a microservice failure that occurs during an execution of a test of an API in connection with a method for providing a testing framework for APIs using a configuration-based approach in order to facilitate testing efficiency and reliability, according to an exemplary embodiment. As illustrated in flow diagram 600, in a scenario that involves a failure of a particular microservice, the service is isolated and brought back to live status in the following manner: First, the action configuration file is read from a database pertaining to the failed microservice. As an example, the action configuration file may include the following content: REDEPLOY: "<redeploy-endpoint>" and RESTART: "<restart-endpoint>". Then, an action from the set of actions from this configuration file is performed by a Microservice Recovery Actor component based on the scores of the action at any given time. Lastly, a Microservice Recovery Critic component then polls the state of the microservice and scores the action based on predetermined parameters and writes this score to the database.

Accordingly, with this technology, an optimized process for providing a testing framework for APIs using a configuration-based approach in order to facilitate testing efficiency and reliability is provided.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims, and their equivalents, and shall not be restricted or limited by the foregoing detailed description.

What is claimed is:

1. A method for testing an application programming interface (API), the method being implemented by at least one processor, the method comprising:
    receiving, by the at least one processor, first information that includes an identification of at least one API to be tested;
    defining, by the at least one processor based on the first information, at least two API endpoints to be tested;
    defining, by the at least one processor, at least one dependency that relates to at least one from among the at least two API endpoints;
    retrieving, by the at least one processor, an authentication model to be used for accessing the at least one API;
    generating, by the at least one processor, a testing plan based on the at least two API endpoints, the at least one dependency, and the authentication model;
    executing, by the at least one processor, a test of the at least one API by using the generated testing plan;
    detecting, by the at least one processor, a failure of a microservice related to the at least one dependency, wherein the microservice is among a plurality of microservices that are chained together;
    integrating, by the at least one processor, previous output data of the microservice with currently generated data to generate a synthetic payload for subsequent microservices for determining an extent of effect caused by the failure of the microservice on the subsequent microservices; and
    automatically isolating the failure of the microservice and converting the microservice back to a live status by:
        reading, from a database, an action configuration file including a set of actions;
        performing, by the at least one processor, an action among the set of actions included in the configuration file based on a score with respect to the failure; and
        polling, by the at least one processor, a state of the microservice and a resultant score of the action performed based on a plurality of parameters.

2. The method of claim 1, further comprising displaying at least one result of the executed test on a graphical user interface (GUI).

3. The method of claim 2, wherein the at least one result includes at least one from among second information that identifies at least one microservice failure; third information that indicates a reason for the at least one microservice failure; fourth information that relates to a completion time for the executed test; and fifth information that relates to at least one measurable metric that indicates a status of the at least one API.

4. The method of claim 2, further comprising transmitting a status notification message to at least one predetermined destination, wherein the status notification message includes information that relates to the at least one result of the executed test.

5. The method of claim 1, further comprising determining, by the at least one processor, a number of times that the test is to be executed with respect to the at least one API.

6. The method of claim 5, further comprising determining whether at least a first subset of occurrences of the test are to be executed in parallel and determining whether at least a second subset of occurrences of the test are to be executed sequentially.

7. The method of claim 1, further comprising executing an artificial intelligence (AI) algorithm that implements a machine learning technique in order to generate a prediction of a result of a future test execution with respect to the at least one API, wherein the AI algorithm is trained by using data that relates to results of previous test executions with respect to the at least one API.

8. The method of claim 1, further comprising receiving a user input that relates to adjusting the testing plan and re-executing the test of the at least one API based on the adjusted testing plan.

9. The method of claim 1, further comprising re-executing the test of the at least one API after the at least one API has received an asynchronous call to perform a function.

10. The method of claim 1, wherein when a microservice failure with respect to a first microservice occurs as a result of a current execution of the test, the method further comprises generating a new testing plan based on data that has previously been outputted by the first microservice and data that has been outputted during the current execution of the test.

11. A computing apparatus for testing an application programming interface (API), the computing apparatus comprising:
    a processor;
    a memory;
    a display; and
    a communication interface coupled to each of the processor, the memory, and the display,
    wherein the processor is configured to:
        receive, via the communication interface, first information that includes an identification of at least one API to be tested;
        define, based on the first information, at least two API endpoints to be tested;
        define at least one dependency that relates to at least one from among the at least two API endpoints;
        retrieve an authentication model to be used for accessing the at least one API;
        generate a testing plan based on the at least two API endpoints, the at least one dependency, and the authentication model;
        execute a test of the at least one API by using the generated testing plan;
        detect a failure of a microservice related to the at least one dependency, wherein the microservice is among a plurality of microservices that are chained together;
        integrate, by the at least one processor, previous output data of the microservice with currently generated data to generate a synthetic payload for subsequent microservices for determining an extent of effect caused by the failure of the microservice on the subsequent microservices; and automatically isolate the failure of the microservice and convert the microservice back to a live status by:
  reading, from a database, an action configuration file including a set of actions;
  performing, by the at least one processor, an action among the set of actions included in the configuration file based on a score with respect to the failure; and
  polling, by the at least one processor, a state of the microservice and a resultant score of the action performed based on a plurality of parameters.

12. The computing apparatus of claim 11, wherein the processor is further configured to cause the display to display at least one result of the executed test via a graphical user interface (GUI).

13. The computing apparatus of claim 12, wherein the at least one result includes at least one from among second information that identifies at least one microservice failure; third information that indicates a reason for the at least one microservice failure; fourth information that relates to a completion time for the executed test; and fifth information that relates to at least one measurable metric that indicates a status of the at least one API.

14. The computing apparatus of claim 12, wherein the processor is further configured to transmit, via the communication interface, a status notification message to at least one predetermined destination, wherein the status notification message includes information that relates to the at least one result of the executed test.

15. The computing apparatus of claim 11, wherein the processor is further configured to determine a number of times that the test is to be executed with respect to the at least one API.

16. The computing apparatus of claim 15, wherein the processor is further configured to determine whether at least a first subset of occurrences of the test are to be executed in parallel and to determine whether at least a second subset of occurrences of the test are to be executed sequentially.

17. The computing apparatus of claim 11, wherein the processor is further configured to execute an artificial intelligence (AI) algorithm that implements a machine learning technique in order to generate a prediction of a result of a future test execution with respect to the at least one API, wherein the AI algorithm is trained by using data that relates to results of previous test executions with respect to the at least one API.

18. The computing apparatus of claim 11, wherein the processor is further configured to receive a user input that relates to adjusting the testing plan and to re-execute the test of the at least one API based on the adjusted testing plan.

19. The computing apparatus of claim 11, wherein the processor is further configured to re-execute the test of the at least one API after the at least one API has received an asynchronous call to perform a function.

20. The computing apparatus of claim 11, wherein when a microservice failure with respect to a first microservice occurs as a result of a current execution of the test, the processor is further configured to generate a new testing plan based on data that has previously been outputted by the first microservice and data that has been outputted during the current execution of the test.

* * * * *